US012692946B2

(12) United States Patent
Miyamoto et al.

(10) Patent No.: US 12,692,946 B2
(45) Date of Patent: Jul. 28, 2026

(54) FLUID CONTROL VALVE, FLUID CONTROL DEVICE, AND METHOD FOR MANUFACTURING ORIFICE

(71) Applicant: HORIBA STEC, Co., Ltd., Kyoto (JP)

(72) Inventors: Hideaki Miyamoto, Kyoto (JP); Naoya Tasaka, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 18/867,430

(22) PCT Filed: May 9, 2023

(86) PCT No.: PCT/JP2023/017371
§ 371 (c)(1),
(2) Date: Nov. 19, 2024

(87) PCT Pub. No.: WO2023/233934
PCT Pub. Date: Dec. 7, 2023

(65) Prior Publication Data
US 2025/0369519 A1 Dec. 4, 2025

(30) Foreign Application Priority Data
May 31, 2022 (JP) ................................. 2022-088771

(51) Int. Cl.
*F16K 1/42* (2006.01)
*F16K 31/02* (2006.01)
*F16K 37/00* (2006.01)

(52) U.S. Cl.
CPC ............... *F16K 1/42* (2013.01); *F16K 31/02* (2013.01); *F16K 37/005* (2013.01)

(58) Field of Classification Search
CPC .......... F16K 1/42; F16K 31/02; F16K 37/005; F16K 1/34; F16K 7/16
See application file for complete search history.

(56) References Cited

U.S. PATENT DOCUMENTS 2,509,456 A * 5/1950 Saballus ................... F16K 7/16
251/117
2019/0178389 A1 6/2019 Sawada et al.

FOREIGN PATENT DOCUMENTS

JP        47005777 A     3/1972
JP        H02116071 U    9/1990
JP        H08105551 A    4/1996
JP        2010230159 A   10/2010
JP        2012219924 A   11/2012
JP        2017223158 A   12/2017
WO        2018021277 A   2/2018

OTHER PUBLICATIONS

International Search Report dated Aug. 1, 2023 issued in International application No. PCT/JP2023/017371.

* cited by examiner

*Primary Examiner* — Daphne M Barry
(74) *Attorney, Agent, or Firm* — Alleman Hall LLP

(57) ABSTRACT
The present invention achieves a larger flow rate of a fluid control valve without increasing a size of an orifice or an actuator. The fluid control valve includes an orifice having a valve seat surface and a valve body having a seating surface to be seated on the valve seat surface. The orifice has a plurality of inflow ports and a plurality of outflow ports that are open along a first direction on the valve seat surface. The plurality of inflow ports and the plurality of outflow ports are arranged side by side in a second direction intersecting the first direction.

10 Claims, 13 Drawing Sheets

PLAN VIEW
ILLUSTRATING VALVE
SEAT SURFACE

31s

X
Y

* ▨ INDICATES VALVE SEAT SURFACE

PLAN VIEW
ILLUSTRATING INFLOW
PORT

31i

X
Y

* ▨ INDICATES INFLOW PORT

PLAN VIEW
ILLUSTRATING
OUTFLOW PORT

31o

X
Y

* ▨ INDICATES OUTFLOW PORT (1) GROOVE WIDTH: 1.2 mm/WALL WIDTH: 0.2 mm
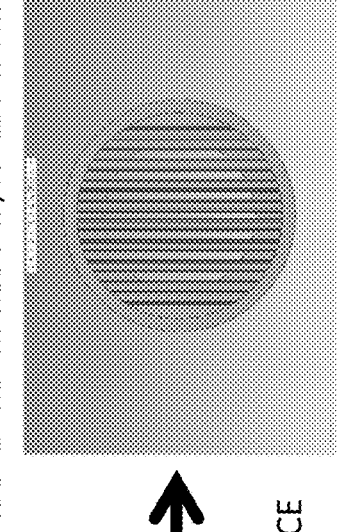
(5) GROOVE WIDTH: 0.55 mm/WALL WIDTH: 0.2 mm
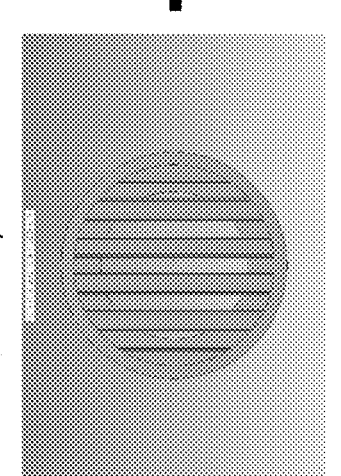
→ (2) → (3) → (4) →
INCREASE LENGTH OF BOUNDARY SURFACE
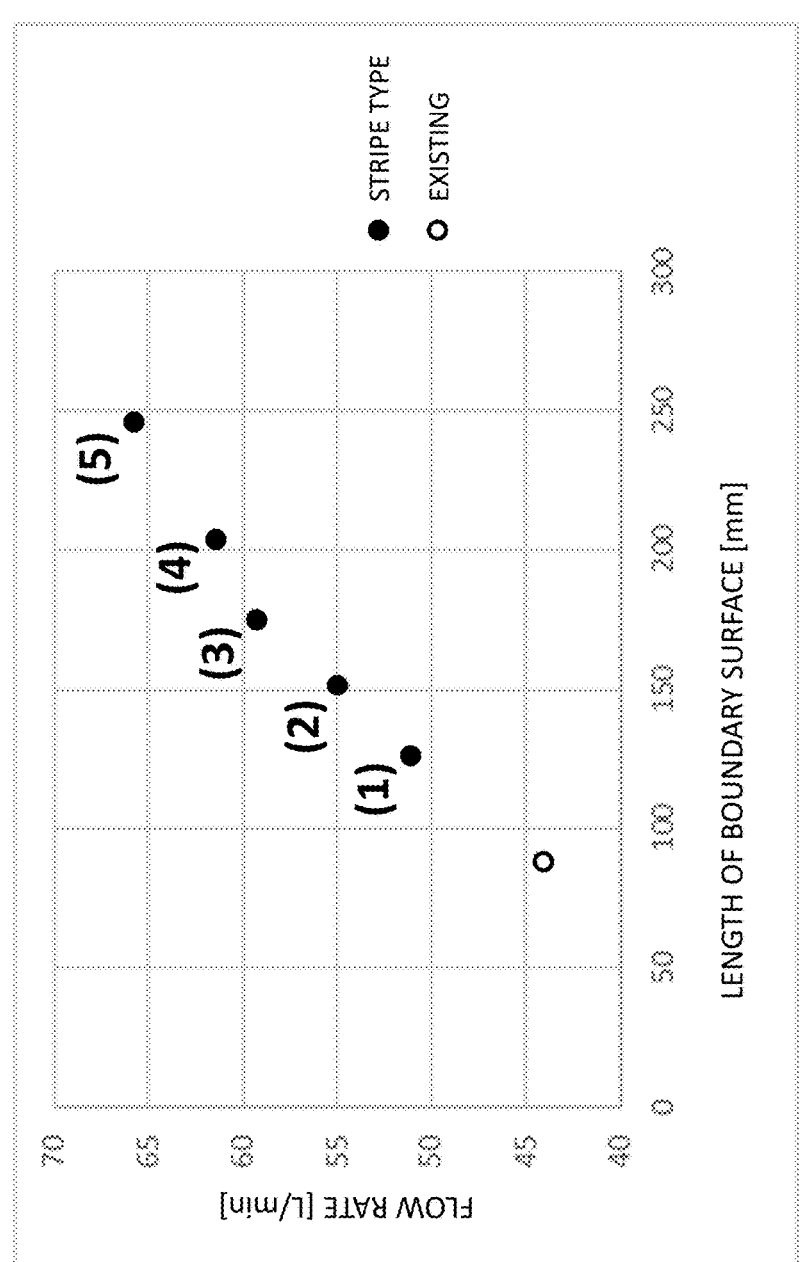
FIG.7

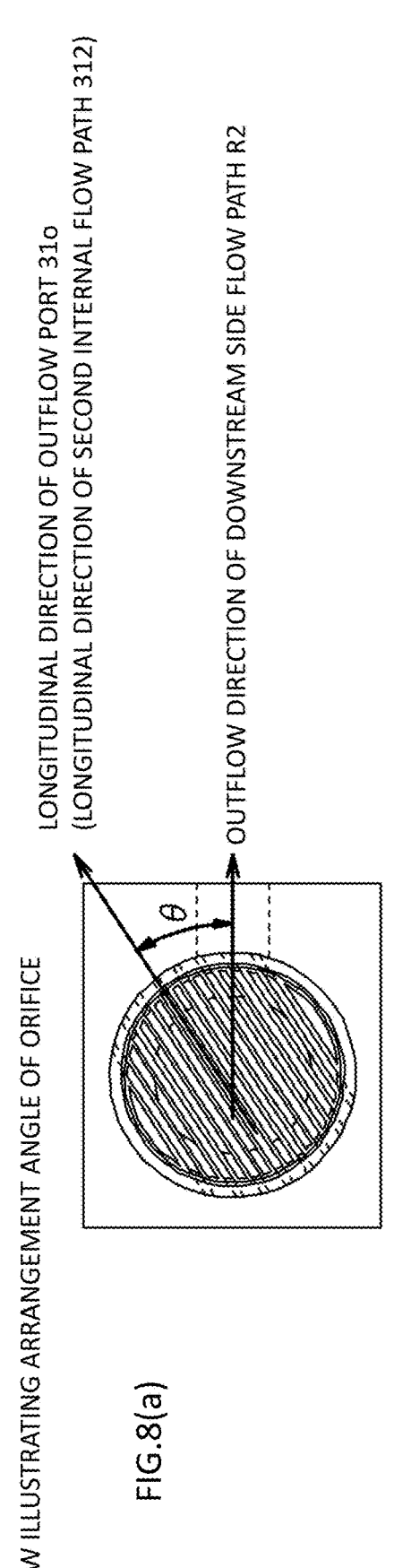

VIEW ILLUSTRATING ARRANGEMENT ANGLE OF ORIFICE

LONGITUDINAL DIRECTION OF OUTFLOW PORT 31o
(LONGITUDINAL DIRECTION OF SECOND INTERNAL FLOW PATH 312)

OUTFLOW DIRECTION OF DOWNSTREAM SIDE FLOW PATH R2

SIMULATION RESULT INDICATING FLOW RATE ACCORDING TO INSTALLATION ANGLE

ARRANGEMENT ANGLE AND FLOW RATE CHARACTERISTICS AT OPENING DEGREE OF 20 μm

Φ9.9

Φ15

ARRANGEMENT ANGLE [°]

FLOW RATE [L/min]

FIG.8(b)

EXAMPLE IN RELATED ART (EXISTING)
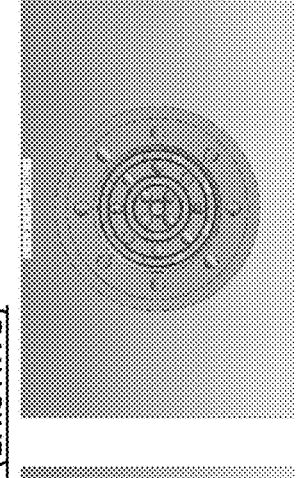
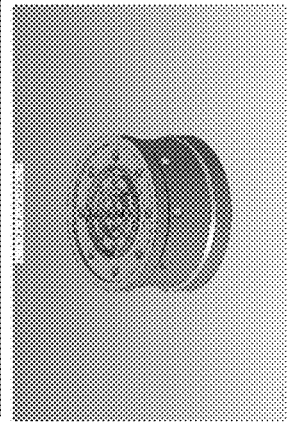
PRESENT EXAMPLE (STRIPE TYPE)
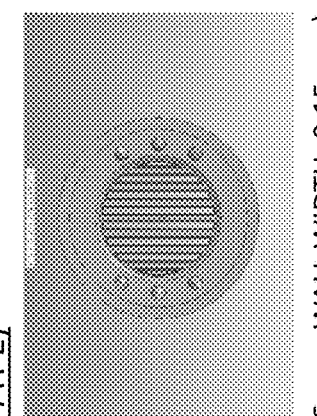
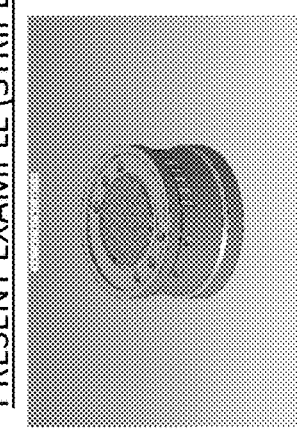
(GROOVE WIDTH: 0.516 mm, WALL WIDTH: 0.15 mm)
ANALYSIS RESULT
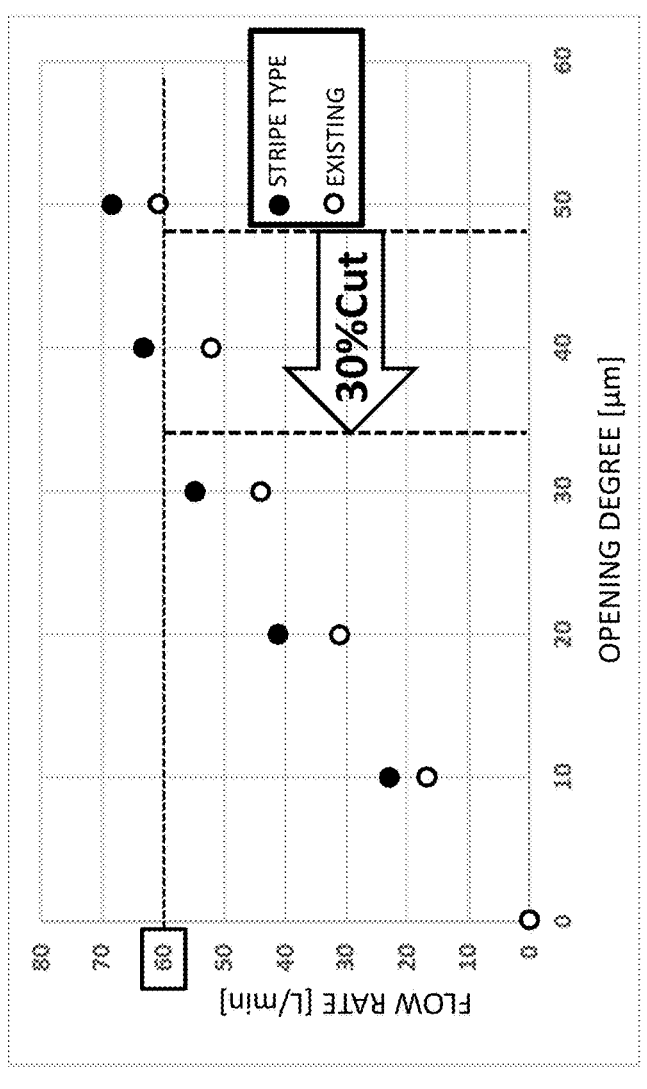
OPENING DEGREE REQUIRED FOR FLOW RATE CONTROL OF 60 L/min IS DECREASED BY ABOUT 30%
FIG.12

FLUID CONTROL VALVE, FLUID CONTROL DEVICE, AND METHOD FOR MANUFACTURING ORIFICE

TECHNICAL FIELD

The present invention relates to a fluid control valve, a fluid control device using the fluid control valve, and a method for manufacturing an orifice to be used in the fluid control valve.

BACKGROUND ART

In related art, it has been desired to increase a flow rate in a fluid control valve, and for example, as indicated in Patent Literature 1, a structure of a valve seat member (orifice) having a valve seat surface has been devised.

Specifically, annular recessed grooves in which a plurality of inflow ports are formed and annular recessed grooves in which a plurality of outflow ports are formed are alternately concentrically formed on the valve seat surface of the valve seat member. In this fluid control valve, a plurality of inflow ports and a plurality of outflow ports are formed in the valve seat member, and the recessed grooves in which the inflow ports are formed and the recessed grooves in which the outflow ports are formed are alternately formed, so that a pressure loss from the plurality of inflow ports to the plurality of outflow ports can be reduced, and a fluid of a large flow rate can be made to flow.

CITATION LIST

Patent Literature

Patent Literature 1: JP 2010-230159 A

SUMMARY OF INVENTION

Technical Problem

However, there is a limit to further increasing a flow rate by forming a plurality of annular recessed grooves in a valve seat surface having a limited size and forming a plurality of inflow ports and a plurality of outflow ports in the recessed grooves. Thus, in order to increase a flow rate using the orifice in the related art, it is necessary to increase a size of the orifice itself or increase a size of an actuator in order to increase a stroke amount of a valve body.

Thus, the present invention has been made in view of the above-described problems, and a main object thereof is to increase a flow rate of a fluid control valve without increasing a size of an orifice or an actuator.

Solution to Problem

In other words, a fluid control valve according to the present invention includes: an orifice having a valve seat surface; and a valve body having a seating surface to be seated on the valve seat surface, in which the orifice has a plurality of inflow ports and a plurality of outflow ports that are open along a first direction on the valve seat surface, and the plurality of inflow ports and the plurality of outflow ports are arranged side by side in a second direction intersecting the first direction.

According to such a fluid control valve, the plurality of inflow ports and the plurality of outflow ports that are open along the first direction are arranged side by side in the second direction intersecting the first direction, so that boundary surfaces between the inflow ports and the outflow ports can be made longer than those of an orifice having recessed grooves formed concentrically in the related art, and a fluid of a large flow rate can be made to flow while reducing a pressure loss. This results in making it possible to increase a flow rate of a fluid control valve without increasing a size of an orifice or an actuator.

In order to further lengthen the boundary surfaces between the inflow ports and the outflow ports, it is preferable that the plurality of inflow ports and the plurality of outflow ports are alternately arranged side by side in the second direction.

In order to further lengthen the boundary surfaces between the inflow ports and the outflow ports, it is preferable that the plurality of inflow ports and the plurality of outflow ports are formed from one end portion to the other end portion of an outer peripheral portion of the valve seat surface along the first direction.

As a specific aspect of the orifice, it is preferable that the orifice includes a first internal flow path that is open to the valve seat surface and an opposing surface facing the valve seat surface, and a second internal flow path that is open to the valve seat surface and an outer peripheral surface between the valve seat surface and the opposing surface, the first internal flow path communicates with one of the inflow ports and the outflow ports, and the second internal flow path communicates with the other of the inflow ports and the outflow ports.

It is preferable that a plurality of the second internal flow paths are formed so as to respectively correspond to the other of the plurality of inflow ports or the plurality of outflow ports. According to this configuration, the second internal flow paths can have a shape along the first direction, that is, a shape extending in one axial direction. For example, in a case where the second internal flow paths are flow paths on an outflow side (downstream side), an outflow direction of the fluid can be determined, so that a pressure loss can be reduced.

As a specific aspect of the second internal flow path, it is preferable that the second internal flow paths are formed to penetrate the orifice along the first direction.

As a specific aspect of the first internal flow path, it is preferable that the first internal flow path includes a merging flow path that is open to the opposing surface and a plurality of branch flow paths that branch from the merging flow path and open to the valve seat surface, and each of the plurality of branch flow paths communicates with one of the plurality of inflow ports and the plurality of outflow ports.

According to this configuration, the first internal flow path has the merging flow path, so that it is possible to reduce a pressure loss when a fluid of a large flow rate is made to flow.

It is preferable that the second internal flow paths are formed in side walls respectively forming the plurality of branch flow paths.

According to this configuration, the merging flow path of the first internal flow path is not restricted by the second internal flow paths, so that a flow path volume of the merging flow path can be increased, and a pressure loss when a fluid of a large flow rate is made to flow can be reduced.

In the configuration in which the valve body is moved relative to the valve seat surface of the orifice, a dead space may be formed around the valve seat surface. In order to allow the fluid flowing in the dead space to flow out without staying, it is preferable that the orifice includes one or a plurality of outer internal flow paths having one end that is open to a circumference of the valve seat surface and the other end that is open to the outer peripheral surface or the opposing surface.

Further, a fluid control device according to the present invention includes the fluid control valve, a flow rate sensor that measures a flow rate of the flow path, and a control unit that controls the fluid control valve based on a measurement value of the flow rate sensor.

Further, a method for manufacturing an orifice according to the present invention is a method for manufacturing an orifice having a valve seat surface on which a valve body of a fluid control valve is to be seated, the method including forming a plurality of inflow ports and a plurality of outflow ports that are open along a first direction on the valve seat surface of the orifice, and forming the plurality of inflow ports and the plurality of outflow ports side by side in a second direction intersecting the first direction.

Advantageous Effects of Invention

According to the present invention described above, it is possible to increase a flow rate of a fluid control valve without increasing a size of an orifice or an actuator.

BRIEF DESCRIPTION OF DRAWINGS

FIG. 7 indicates simulation results indicating a boundary surface length and a flow rate of the orifice (present example) of the embodiment and an orifice in related art (example in the related art).

FIG. 8(a) is a view indicating an arrangement angle of the orifice, and FIG. 8(b) indicates simulation results of a flow rate according to the arrangement angle of the embodiment.

FIG. 12 indicates simulation results of an opening degree and flow rate characteristics of the orifice (present example) of the modification and the orifice in the related art (example in the related art).

DESCRIPTION OF EMBODIMENTS

Figure 1:
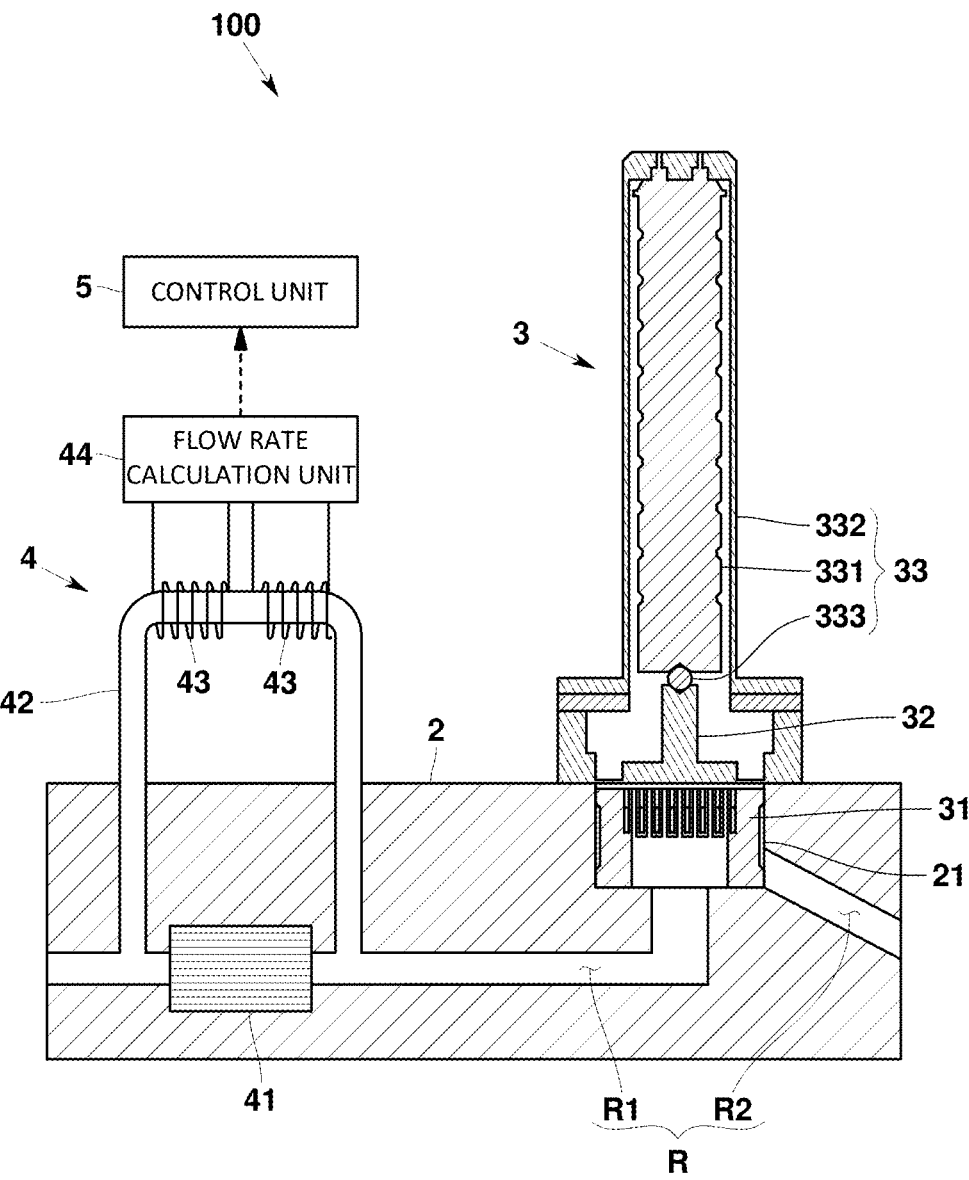
FIG. 1 is a view schematically illustrating a configuration of a fluid control device according to one embodiment of the present invention.

Hereinafter, a fluid control device according to one embodiment of the present invention will be described with reference to the drawings. Note that any of the drawings indicated below is illustrated while omission or exaggeration is performed as appropriate for easy understanding. The same components are denoted by the same reference numerals, and description thereof will be omitted as appropriate.

Device Configuration

A fluid control device 100 of the present embodiment is a so-called mass flow controller, and is used, for example, to control a flow rate of gas to be supplied to a chamber in which a semiconductor manufacturing process is to be performed. Note that the fluid control device 100 may control not only gas but also liquid.

Specifically, as illustrated in FIG. 1, the fluid control device 100 includes a flow path block 2 in which a flow path R is formed, a fluid control valve 3 for controlling gas in the flow path R, a flow rate sensor 4 that measures a flow rate of the flow path R, and a control unit 5 that controls the fluid control valve 3 based on a measurement value measured by the flow rate sensor 4.

In the flow path block 2, a housing recess 21 to which the fluid control valve 3 is attached is formed. The housing recess 21 is formed on one surface (upper surface in FIG. 1) of the flow path block 2. An upstream flow path R1 is connected to a bottom surface of the housing recess 21, and a downstream flow path R2 is connected to an inner peripheral surface of the housing recess 21. In other words, the flow path R formed in the flow path block 2 is divided into the upstream flow path R1 and the downstream flow path R2 by the housing recess 21.

Note that a gas introduction port (not illustrated) is provided at an upstream end of the upstream flow path R1, and a gas lead-out port (not illustrated) is provided at a downstream end of the downstream flow path R2.

The fluid control valve 3 is a so-called normally open valve, and its opening degree is controlled by a voltage to be applied. Note that the fluid control valve 3 may be a so-called normally closed valve.

Figure 2:
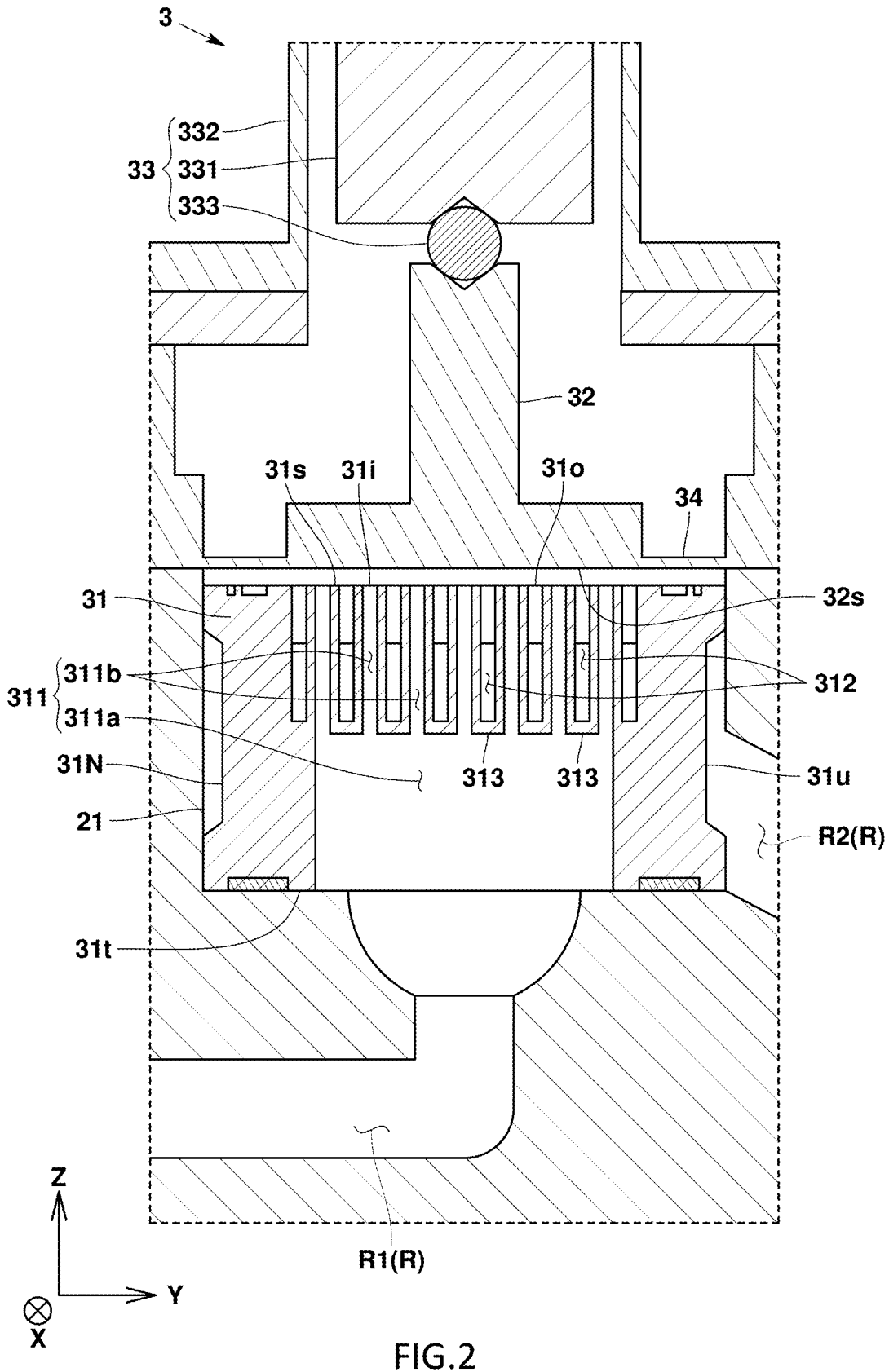
FIG. 2 is a partially enlarged cross-sectional view illustrating an orifice and a valve body of the fluid control valve of the embodiment.

Specifically, as illustrated in FIGS. 1 and 2, the fluid control valve 3 includes an orifice (valve seat member) 31 having a valve seat surface 31s, a valve body 32 having a seating surface 32s to be seated on the valve seat surface 31s, and a drive unit 33 that drives the valve body 32.

The orifice 31 is housed in the housing recess 21. Here, the valve seat surface 31s is formed on an upper surface of the orifice 31, and the orifice 31 is housed in the housing recess 21 such that the valve seat surface 31s faces an upper opening side of the housing recess 21.

As illustrated in FIG. 2, in the orifice 31, inflow ports 31i and outflow ports 31o are formed on the valve seat surface 31s, and a first internal flow path 311 and second internal flow paths 312 communicating with the inflow ports 31i and the outflow ports 31o are formed.

In a state where the orifice 31 is housed in the housing recess 21, the first internal flow path 311 is provided so as to surround a bottom surface opening of the housing recess 21, and a lower surface of the orifice 31 is provided on a bottom surface of the housing recess 21 in a liquid-tight manner via a seal member such as a metal O-ring (see FIG. 1). In other words, all the fluid flowing through the upstream flow path R1 flows into the first internal flow path 311 of the orifice 31. Other details of the orifice 31 will be described later.

The valve body 32 is formed integrally with a diaphragm member 34 provided so as to close an opening of the housing recess 21 of the flow path block 2. A side peripheral edge of the diaphragm member 34 is fixed in a liquid-tight manner to a peripheral edge portion of the upper opening of the housing recess 21 via a seal member such as a metal O-ring.

As illustrated in FIG. 2, a central portion (that is, a lower surface of the valve body 32) of the diaphragm member 34 has a seating surface 32s that moves forward and backward with respect to the orifice 31 by the drive unit 33 and is seated on or separated from the valve seat surface 31s of the orifice 31.

The drive unit 33 includes, for example, a piezo actuator 331 formed by stacking a plurality of piezoelectric elements that expand and deform in a state where a voltage is applied. The piezo actuator 331 is housed in a casing 332, and an intermediate member 333 such as a true sphere is provided at a tip portion thereof, and the intermediate member 333 presses an upper surface of the valve body 32.

Then, when a predetermined voltage is applied to the piezo actuator 331, the piezo actuator 331 extends, biases the valve body 32 in a valve closing direction, the seating surface 32s approaches the valve seat surface 31s by a distance corresponding to the applied voltage to achieve a predetermined opening degree, and when the seating surface 32s comes into contact with the valve seat surface 31s, the state becomes a fully closed state. On the other hand, in a normal state where no voltage is applied to the piezo actuator 331, the valve body 32 is fully open by elastic restoring force of the diaphragm member 34.

The flow rate sensor 4 is of, for example, a thermal type, and includes a flow dividing element (fluid resistance) 41 provided in the flow path R, a narrow tube 42 that branches from an upstream side of the flow dividing element 41 and merges into a downstream side of the flow dividing element 41, two electroheating coils 43 that are wound around the narrow tube 42 and to which a voltage is applied so as to be each kept at a constant temperature, and a flow rate calculation unit 44 that detects a difference in voltages applied to the respective electroheating coils 43 and calculates a flow rate of gas flowing through the flow path R. The flow rate sensor 4 is provided on an upstream side or a downstream side of the fluid control valve 3 in the flow path R.

The control unit 5 controls the fluid control valve 3 based on a measurement value (measured flow rate) measured by the flow rate sensor 4. The control unit 5 is a computer including a CPU, a memory, an A/D converter, a D/A converter, and various kinds of input/output means, and controls the fluid control valve 3 by executing a fluid control program stored in the memory and cooperating with the CPU and a peripheral device.

The control unit 5 controls an opening degree of the fluid control valve 3 based on a command flow rate input from the outside and the measured flow rate measured by the flow rate sensor 4. Specifically, the control unit 5 controls the opening degree of the fluid control valve 3 so as to reduce deviation between the command flow rate and the measured flow rate. The control unit 5 of the present embodiment performs PID calculation on the deviation between the command flow rate and the measured flow rate and outputs a command voltage corresponding to the result to a drive circuit of the drive unit 33. The drive circuit applies a voltage corresponding to the input command voltage to the piezo actuator 331.

Specific Configuration of Orifice 31

As illustrated in FIGS. 3 to 6, the orifice 31 of the present embodiment has a substantially disk shape and includes a plurality of inflow ports 31i and a plurality of outflow ports 31o that are open along the first direction on the valve seat surface 31s having a circular outer contour formed on an upper surface of the orifice 31. In FIGS. 3 to 6, the first direction is an X direction, a second direction intersecting (although orthogonal in this case, it may be other than orthogonal) the first direction is a Y direction, and a direction orthogonal to the X direction and the Y direction is a Z direction.

The plurality of inflow ports 31i and the plurality of outflow ports 31o have a linear elongated opening shape extending along the first direction (X direction). Here, the plurality of inflow ports 31i and the plurality of outflow ports 31o are formed from one end portion to the other end portion of the outer peripheral portion of the valve seat surface 31s along the first direction. In the present embodiment, an opening width (dimension in the second direction (Y direction)) of each of the inflow ports 31i in the second direction (Y direction) is constant over the first direction (X direction). Further, the plurality of inflow ports 31i have the same opening width. Similarly, an opening width of each of the outflow ports 31o in the second direction (Y direction) is constant over the first direction (X direction). Further, the plurality of outflow ports 31o have the same opening width.

The plurality of inflow ports 31i and the plurality of outflow ports 31o are alternately arranged side by side in the second direction (Y direction) intersecting the first direction (X direction). The plurality of inflow ports 31i and the plurality of outflow ports 31o are arranged at equal intervals in the second direction (Y direction). In this manner, the plurality of inflow ports 31i and the plurality of outflow ports 31o are formed in a stripe shape on the valve seat surface 31s of the orifice 31. A linear valve seat surface 31s extending along the first direction is formed between the inflow port 31i and the outflow port 31o that are adjacent to each other in the second direction (Y direction).

Specifically, the orifice 31 includes a first internal flow path 311 that is open to the valve seat surface 31s and an opposing surface 31t facing the valve seat surface 31s, and second internal flow paths 312 that are open to the valve seat surface 31s and an outer peripheral surface 31u between the valve seat surface 31s and the opposing surface 31t.

Figure 5:
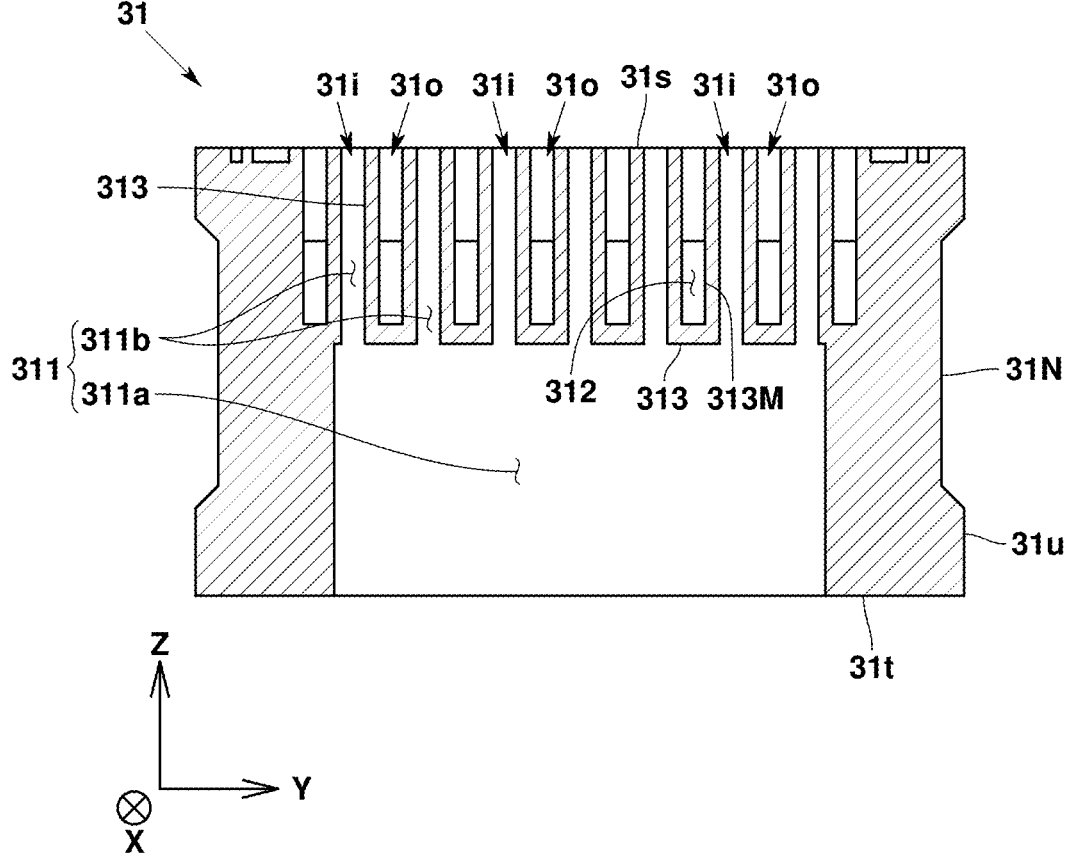
FIG. 5 is a cross-sectional view taken along a line A-A of the orifice of the embodiment.

The first internal flow path 311 is formed to extend in the Z direction and communicates with the plurality of inflow ports 31i and includes a merging flow path 311a that is open to the opposing surface 31t and a plurality of branch flow paths 311b that branch from the merging flow path 311a and open to the valve seat surface 31s. Note that as illustrated in FIG. 5, the first internal flow path 311 has a comb-like vertical cross-sectional shape along a YZ plane.

The merging flow path 311a is a flow path into which a fluid flows from the upstream flow path R1 that is open to the bottom surface of the housing recess 21. The merging flow path 311a is, for example, a flow path having a circular cross section.

Each of the plurality of branch flow paths 311b communicates with each of the plurality of inflow ports 31i and branches the fluid from the merging flow path 311a and guides the fluid to each of the inflow ports 31i. The plurality of branch flow paths 311b are formed at equal intervals in the second direction, and the cross-sectional shape (cross-sectional shape along an XY plane) of each of the branch flow paths 311b is substantially the same as the opening shape of each communicating inflow port 31i.

The second internal flow paths 312 communicate with the plurality of outflow ports 31o, and a plurality of second internal flow paths are formed so as to respectively correspond to the plurality of outflow ports 31o. Specifically, the second internal flow paths 312 are formed to penetrate the orifice 31 along the first direction (X direction) which is a longitudinal direction of the outflow ports 31*o*. In other words, the second internal flow paths 312 communicate with the outflow ports 31*o* and are open to the outer peripheral surface 31*u* of the orifice 31 on both sides in the longitudinal direction of the outflow ports 31*o* and are open to the outer peripheral surface 31*u* of the orifice 31 at two locations in the present embodiment. Note that an opening shape of the outer peripheral surface 31*u* of each of the second internal flow paths 312 has a rectangular shape, but may have other shapes.

Further, the second internal flow paths 312 are formed along the first direction (X direction) in side wall portions 313 in the second direction (Y direction) respectively forming the plurality of branch flow paths 311*b* in the orifice 31 (see FIG. 5). In other words, the plurality of second internal flow paths 312 and the plurality of branch flow paths 311*b* are alternately arranged side by side in the second direction (Y direction) similarly to the plurality of inflow ports 31*i* and the plurality of outflow ports 31*o*. Here, regarding a configuration of the side wall portion 313, the side wall portion 313 is formed with recessed grooves 313*m* that are open to the valve seat surface 31*s*, upper openings of the recessed grooves 313*m* serve as the outflow ports 31*o*, and an upper surface of the side wall portion 313 serves as part of the valve seat surface 31*s*.

Figure 6A:
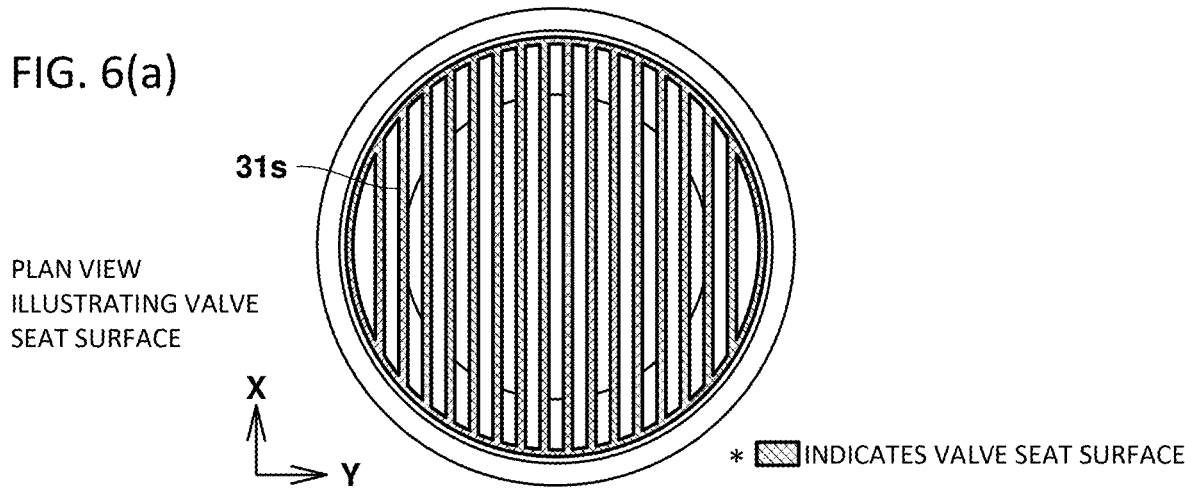
FIG. 6(a) is a schematic view illustrating a valve seat surface of the orifice of the embodiment.
Figure 6B:
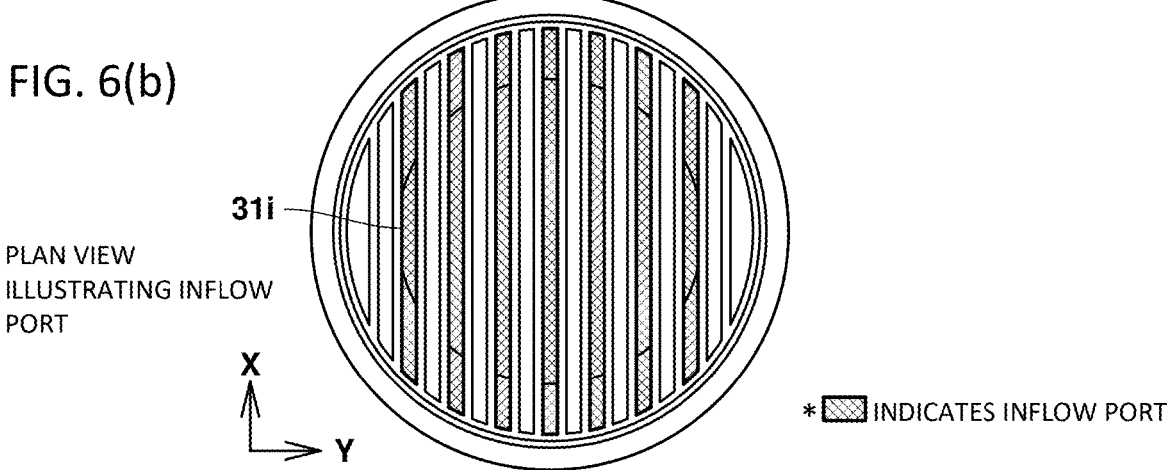
FIG. 6(b) is a schematic view illustrating an inflow port.
Figure 6C:
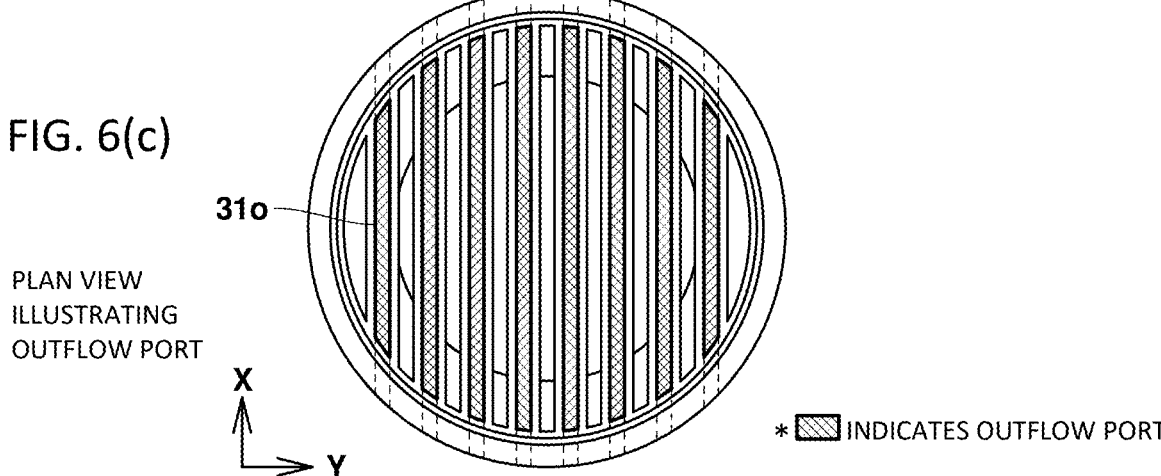
FIG. 6(c) is a schematic view illustrating an outflow port.

According to the above-described orifice structure, the inflow ports 31*i* (see FIG. 6(*b*)) having a linear elongated shape and the outflow ports 31*o* (see FIG. 6(*c*)) having a linear elongated shape are adjacent to each other, and boundary surfaces (part of the valve seat surface 31*s*) between the inflow ports 31*i* and the outflow ports 31*o* extend linearly (see FIG. 6(*a*)), so that the boundary surfaces per unit area of the valve seat surface 31*s* can be lengthened. Here, by increasing the number of the inflow ports 31*i* and the outflow ports 31*o* and decreasing a pitch (width) of the inflow ports 31*i* and the outflow ports 31*o*, the number of boundary surfaces can be increased and a width of the boundary surfaces can be decreased. This can reduce a pressure loss in the orifice 31 and allows a fluid of a large flow rate to flow.

Here, simulation results of the boundary surface length and the flow rate between the orifice 31 (the present examples (1) to (5)) having different boundary surface lengths and the orifice having the configuration in the related art (example in the related art) are indicated in FIG. 7. Here, a distance (opening degree) between the valve seat surface 31*s* and the seating surface 32*s* is set at 30 μm. Note that in the drawings, "stripe type" indicates the present example, "existing" indicates the example in the related art, and the boundary surface lengths of the present examples (2) to (4) are between the boundary surface length of the present example (1) and the boundary surface length of the present example (5), and gradually increase in the order of (2), (3), and (4). As can be seen from FIG. 7, in the present embodiment, as the opening widths of the plurality of inflow ports 31*i* and the plurality of outflow ports 31*o* are made smaller, the number of the inflow ports 31*i* and the outflow ports 31*o* are increased, the boundary surface length is made longer, and a fluid of a larger flow rate can be made to flow.

Figure 3:
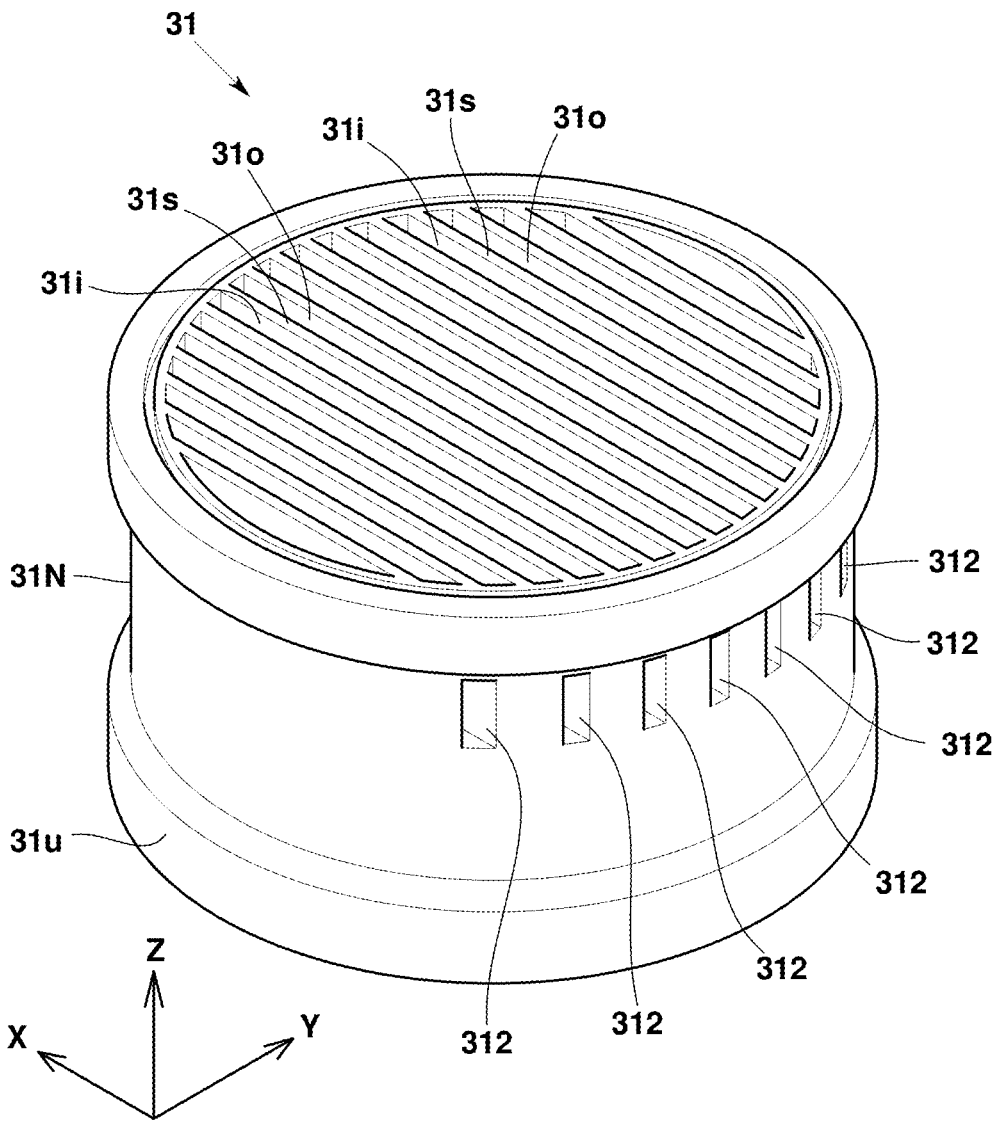
FIG. 3 is a perspective view of the orifice of the embodiment.
Figure 4:
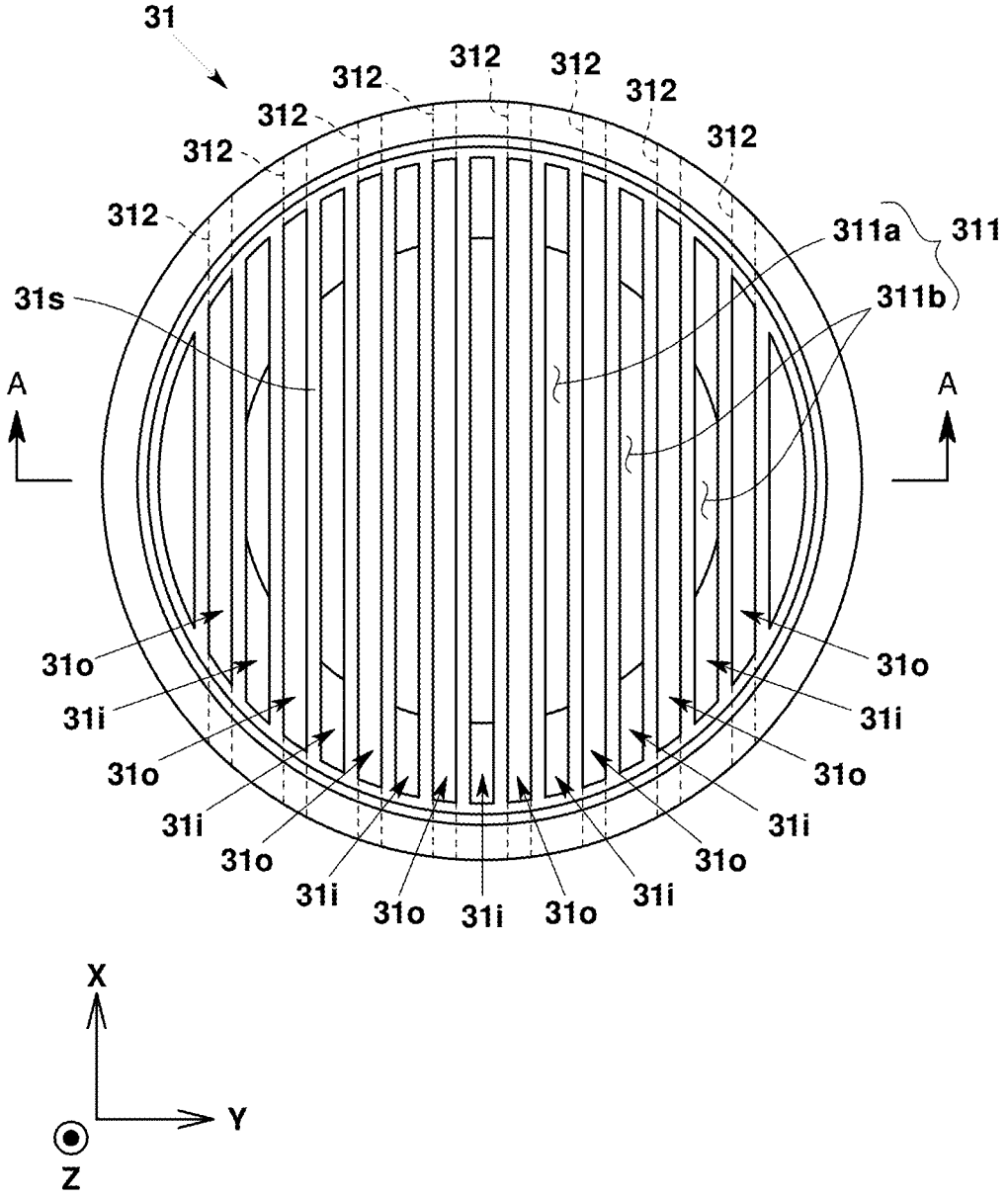
FIG. 4 is a plan view of the orifice of the embodiment.

In addition, a recess 31N is also formed on the entire outer peripheral surface 31*u* of the orifice 31 (see FIGS. 3 and 5). This recess 31N makes the flow path between the recess 31N and the housing recess 21 larger and reduces a pressure loss, so that a larger flow rate can be achieved.

Note that the orifice 31 may be formed by subjecting a base material to machining such as cutting, or may be formed by dividing the base material into a plurality of elements, processing the divided elements into a predetermined shape by etching, or the like, and then joining the processed divided elements.

Next, flow of the fluid in a state where the fluid control valve 3 is open will be briefly described.

In a state where the seating surface 31*s* is separated from the valve seat surface 32*s* (valve open state), the fluid flows from the upstream flow path R1 of the flow path block 2 to the merging flow path 311*a* of the orifice 31, and the fluid flows from the plurality of branch flow paths 311*b* to between the valve seat surface 31*s* and the seating surface 32*s* through the plurality of inflow ports 31*i*. Then, the fluid flows into the plurality of outflow ports 31*o* and flows between the outer peripheral surface 31*u* of the orifice 31 and the inner peripheral surface of the housing recess 21 through the second internal flow paths 312. Thereafter, the fluid flows out from the downstream flow path R2 of the flow path block 2.

While the orifice 31 having the above-described configuration allows a fluid of a large flow rate to flow, it is also possible to further make a fluid of a large flow rate to flow by an arrangement angle of the orifice 31 in the housing recess 21.

Thus, the arrangement angle of the orifice 31 in the housing recess 21 will be described. Here, as illustrated in FIG. 8(*a*), a state in which the outflow direction of the downstream flow path R2 that is open to the inner peripheral surface of the housing recess 21 coincides with the longitudinal direction of the outflow ports 31*o* of the orifice 31 (the longitudinal direction of the second internal flow path 312) is defined as 0°, and an angle formed by the outflow direction and the longitudinal direction of the outflow ports 31*o* is defined as an arrangement angle θ.

FIG. 8(*b*) indicates flow rate change according to the arrangement angle θ of the orifice 31. FIG. 8(*b*) indicates flow rate change between a case where a distance (opening degree) between the valve seat surface 31*s* and the seating surface 32*s* is set at 20 μm and an outer diameter (Φ) of the valve seat surface 31*s* is set at 9.9 mm and a case where the outer diameter (Φ) is set at 15 mm.

From these results, it can be seen that the flow rate can be increased by setting the arrangement angle θ of the orifice 31 at 15 degrees or more and 75 degrees or less. Furthermore, it can be seen that the flow rate can be further increased by setting the arrangement angle θ of the orifice 31 at 30 degrees or more and 60 degrees or less.

Effects of Present Embodiment

According to the fluid control device 100 of the present embodiment configured as described above, the plurality of inflow ports 31*i* and the plurality of outflow ports 31*o* that are open along the first direction are alternately arranged side by side in the second direction intersecting the first direction, so that it is possible to lengthen the boundary surfaces between the inflow ports 31*i* and the outflow ports 31*o* as compared with the orifice in the related art having the recessed grooves that are concentrically formed, allow a fluid of a large flow rate to flow while reducing a pressure loss. This results in making it possible to increase a flow rate of the fluid control valve 3 without increasing sizes of the orifice 31 and the piezo actuator 331.

In addition, a plurality of the second internal flow paths 312 are formed so as to respectively correspond to the plurality of outflow ports 31*o*, and have a shape along the first direction, that is, a shape extending in one axial direction, so that it is possible to determine an outflow direction of the fluid and reduce a pressure loss.

Furthermore, the first internal flow path 311 includes the merging flow path 311a, so that it is possible to reduce a pressure loss when a fluid of a large flow rate is made to flow.

In addition, the second internal flow paths 312 are formed in the side wall portions 313 respectively forming the plurality of branch flow paths 311b, so that the merging flow path 311a of the first internal flow path 311 is not restricted by the second internal flow paths 312, a flow path volume of the merging flow path 311a can be increased, and a pressure loss when a fluid of a large flow rate is made to flow can be reduced.

Other Embodiments

Figure 9:
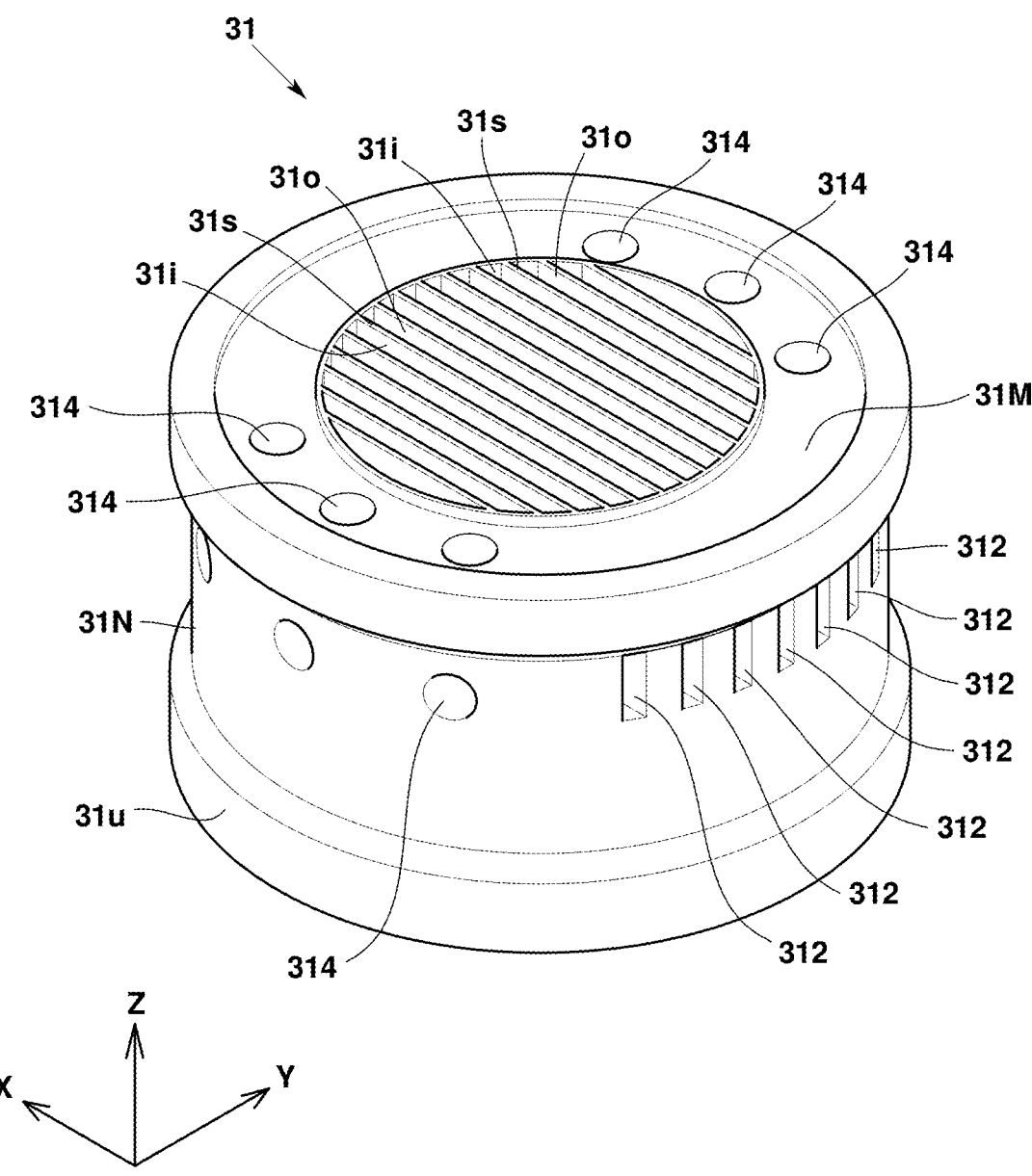
FIG. 9 is a perspective view of an orifice of a modification.
Figure 10:
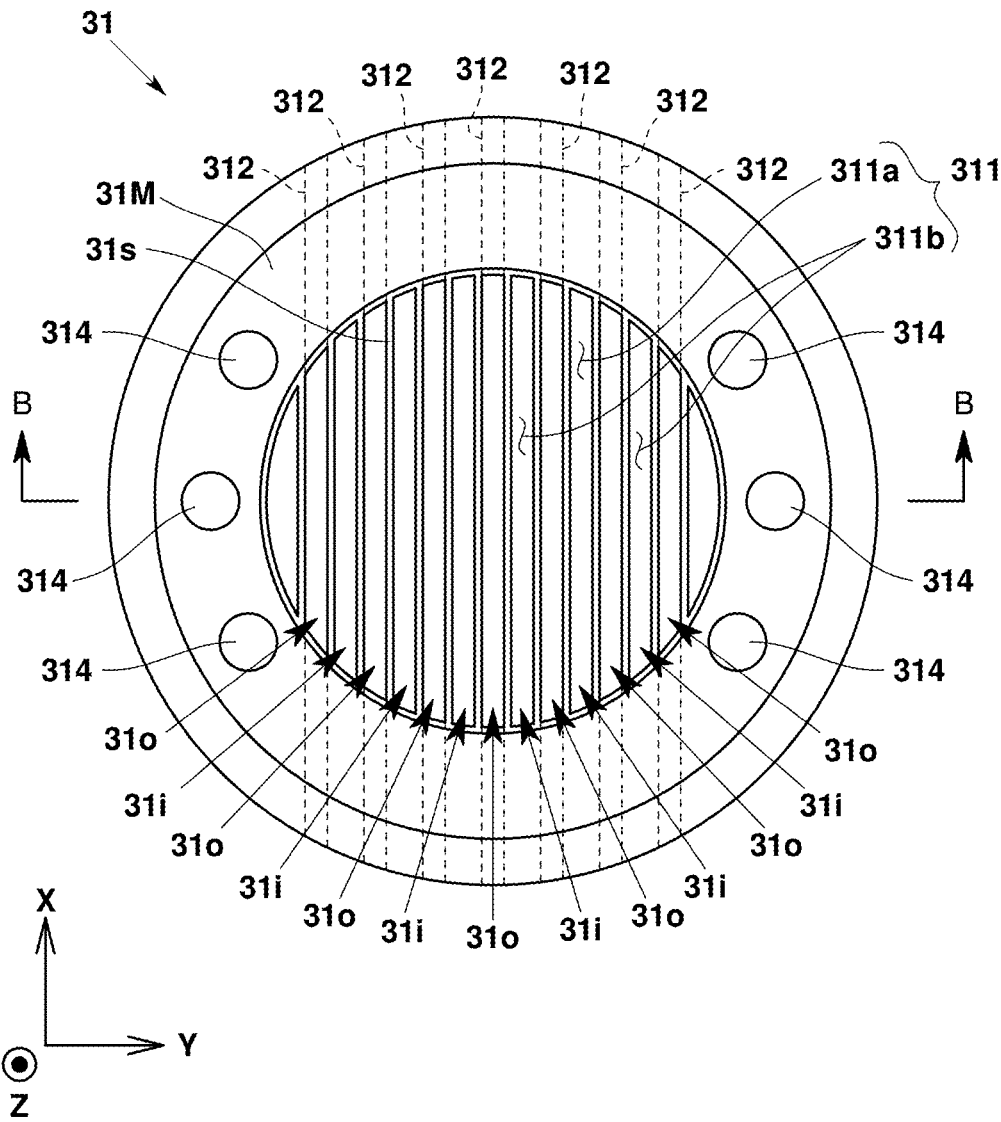
FIG. 10 is a plan view of the orifice of the modification.
Figure 11:
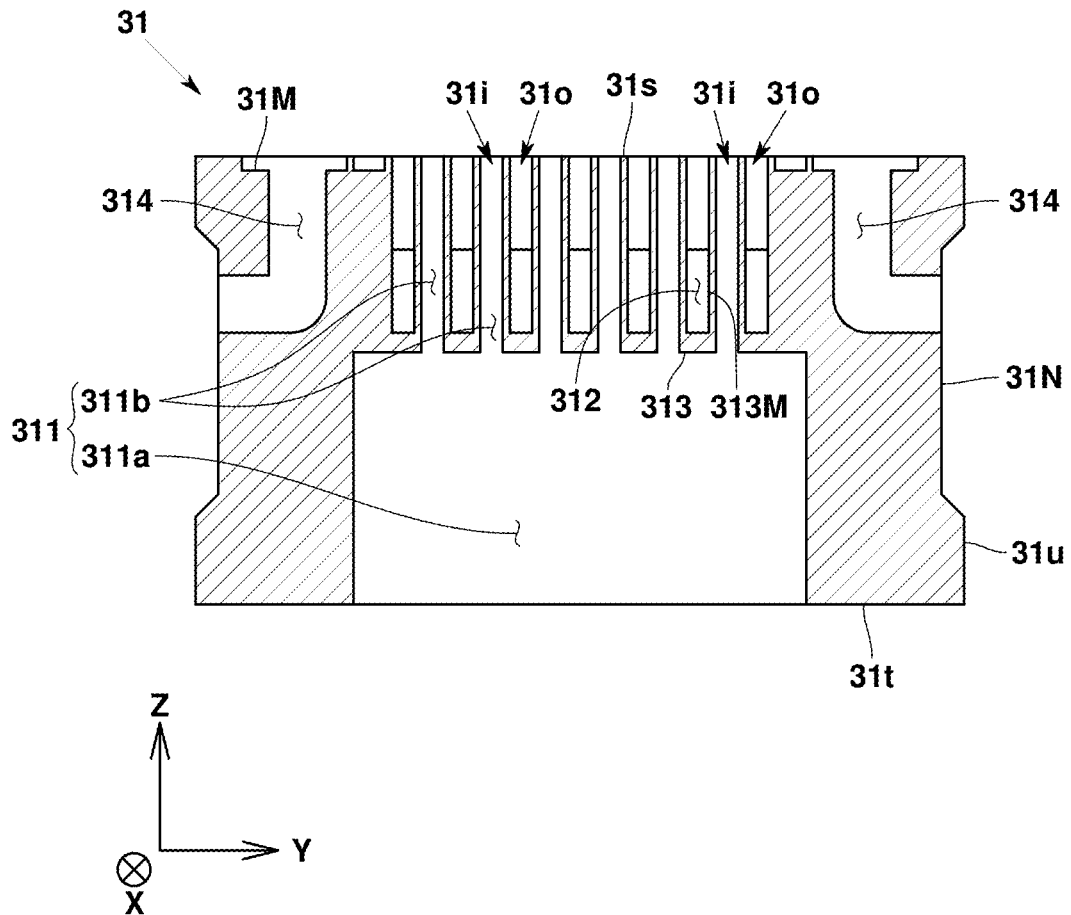
FIG. 11 is a cross-sectional view taken along a line B-B of the orifice of the modification.

For example, as illustrated in FIGS. 9 to 11, the orifice 31 may have one or a plurality of outer internal flow paths 314 having one end open to the circumference of the valve seat surface 31s and the other end open to the outer peripheral surface 31u or the opposing surface 31t.

Specifically, the orifice 31 has a valve seat surface 31s having a circular outer shape in plan view, and an annular recessed groove 31M is formed around the valve seat surface 31s on an upper surface on which the valve seat surface 31s is formed. One ends of the outer internal flow paths 314 are open on a bottom surface of the recessed groove 31M.

In addition, the other ends of the outer internal flow paths 314 are open on the outer peripheral surface 31u of the orifice 31, here, a recess 31N formed on the outer peripheral surface 31u. According to this configuration, the fluid flowing into a dead space formed around the valve seat surface 31s can be made to flow out.

FIG. 12 indicates simulation results of an opening degree and flow rate characteristics of the orifice 31 (present example) illustrated in FIGS. 9 to 11 and the orifice having the configuration in the related art (example in the related art). Note that in the drawing, "stripe type" indicates the present example, and "existing" indicates the example in the related art. As can be seen from FIG. 12, in the present example, the boundary surfaces between the inflow ports and the outflow ports become long. Further, in the present example, the opening degree required for the flow rate control of 60 L/min can be decreased by about 30% as compared with the example in the related art. As a result, it is not necessary to increase a size of the piezo actuator 331 or a size of the orifice 31 in order to increase the opening degree.

Further, while the plurality of inflow ports 31i of the above embodiment have the same opening width (dimension in the second direction), they may have opening widths different from each other. Still further, the opening widths of the plurality of outflow ports 31o may also be different from each other. Yet further, the opening widths of the inflow ports 31i and the outflow ports 31o may be the same or different from each other. Further, the opening widths of the inflow ports 31i or the outflow ports 31o may change in the first direction. In addition, the plurality of inflow ports 31i or the plurality of outflow ports 31o do not have to be parallel to each other, and the inflow port 31i and the outflow port 31o do not have to be parallel to each other.

Further, the inflow ports 31i and the outflow ports 31o of the embodiment have a linear shape extending in the first direction, but may have a curved shape, a wave shape, or the like, extending along the first direction.

Further, in the above embodiment, the plurality of inflow ports 31i and the plurality of outflow ports 31o are alternately arranged, but the plurality of inflow ports and the plurality of outflow ports do not necessarily have to be alternately arranged. For example, the two inflow ports 31i and the two outflow ports 31o may be alternately arranged, or the two outflow ports 31o may be arranged on both sides of the two inflow ports 31i.

Moreover, in the above embodiment, the inflow ports 31i communicate with the first internal flow path 311, and the outflow ports 31o communicates with the second internal flow paths 312, but the opposite configuration, that is, the inflow ports 31i may communicate with the second internal flow paths 312, and the outflow ports 31o may communicate with the first internal flow path 311.

In addition, the opening portions of the first internal flow path 311 and the second internal flow paths 312 of the above-described embodiment are not limited to the above-described embodiment, and the first internal flow path 311 may be open to the outer peripheral surface 31u of the orifice 31, and the second internal flow paths 312 may be open to the opposing surface 31t of the orifice 31.

In addition, the flow rate sensor 4 of the above embodiment is of a thermal type, but may be of a pressure type.

Figure 13:
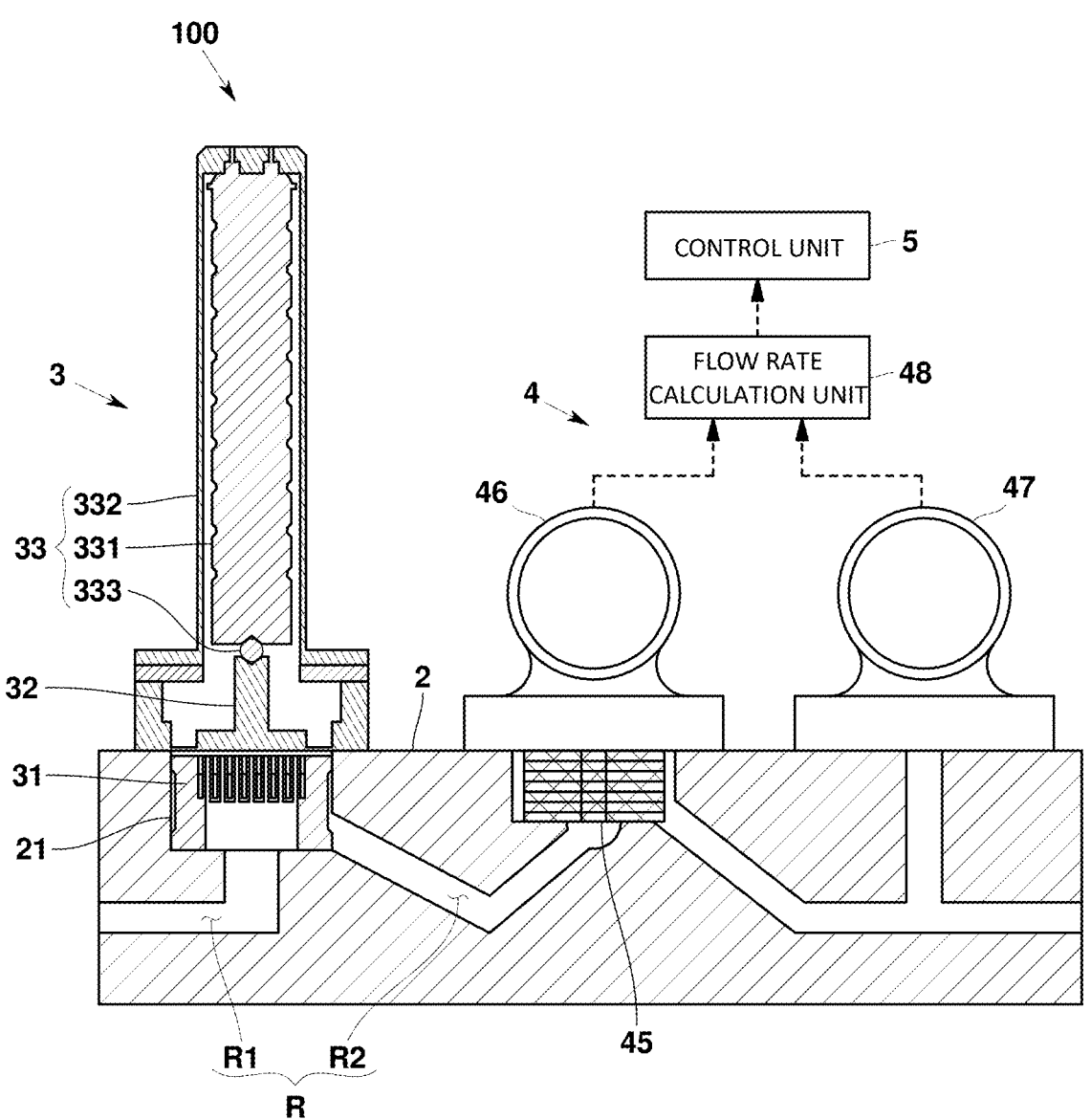
FIG. 13 is a view schematically illustrating a configuration of a fluid control device according to the modification.

Specifically, as illustrated in FIG. 13, the pressure-type flow rate sensor 4 includes a laminar flow element 45 provided in the flow path R, a first pressure sensor 46 that measures a pressure on an upstream side of the laminar flow element 45, a second pressure sensor 47 that measures a pressure on a downstream side of the laminar flow element 45, and a flow rate calculation unit 48 that calculates a flow rate of a fluid flowing through the flow path R based on the first pressure and the second pressure measured by the first pressure sensor 46 and the second pressure sensor 47. The flow rate sensor 4 is provided on an upstream side or a downstream side of the fluid control valve 3 in the flow path R. Note that instead of the laminar flow element 45, other fluid resistors such as a sonic nozzle may be used.

In addition, various modifications and combinations of the embodiments may be made without departing from the gist of the present invention.

INDUSTRIAL APPLICABILITY

According to the present invention, it is possible to achieve a large flow rate of a fluid control valve without increasing a size of an orifice or an actuator.

REFERENCE CHARACTERS LIST

100 fluid control device
3 fluid control valve
4 flow rate sensor
5 control unit
31 orifice
31s valve seat surface
31t opposing surface
31u outer peripheral surface
31i inflow port
31o outflow port
311 first internal flow path
311a merging flow path
311b branch flow path
312 second internal flow path
314 outer internal flow path
32 valve body
32s seating surface

The invention claimed is:

1. A fluid control valve comprising:

an orifice having a valve seat surface; and a valve body having a seating surface to be seated on the valve seat surface, wherein the orifice has a plurality of inflow ports and a plurality of outflow ports that are open along a first direction on the valve seat surface, and the plurality of inflow ports and the plurality of outflow ports are arranged side by side in a second direction intersecting the first direction, wherein the orifice includes:

a first internal flow path that is open to the valve seat surface and an opposing surface facing the valve seat surface; and a second internal flow path that is open to the valve seat surface and an outer peripheral surface between the valve seat surface and the opposing surface, the first internal flow path communicates with one of the plurality of inflow ports and the plurality of outflow ports, and the second internal flow path communicates with the other of the plurality of inflow ports and the plurality of outflow ports.

2. The fluid control valve according to claim 1, wherein the plurality of inflow ports and the plurality of outflow ports are alternately arranged side by side in the second direction.

3. The fluid control valve according to claim 1, wherein the plurality of inflow ports and the plurality of outflow ports are formed from one end portion to another end portion of an outer peripheral portion of the valve seat surface along the first direction.

4. The fluid control valve according to claim 1, wherein a plurality of second internal flow paths are formed so as to respectively correspond to the other of the plurality of inflow ports and the plurality of outflow ports.

5. The fluid control valve according to claim 1, wherein a plurality of second internal flow paths are formed to penetrate the orifice along the first direction.

6. The fluid control valve according to claim 1, wherein the first internal flow path includes:

a merging flow path that is open to the opposing surface; and a plurality of branch flow paths that branch from the merging flow path and are open to the valve seat surface, and each of the plurality of branch flow paths communicates with one of the plurality of inflow ports and the plurality of outflow ports.

7. The fluid control valve according to claim 6, wherein a plurality of second internal flow paths are formed in side walls respectively forming the plurality of branch flow paths.

8. The fluid control valve according to claim 1, wherein the orifice includes one or a plurality of outer internal flow paths having one end that is open to a circumference of the valve seat surface and another end that is open to the outer peripheral surface or the opposing surface.

9. A fluid control device comprising:

a fluid control valve according to claim 1;

a flow rate sensor that measures a flow rate of the flow path; and a control unit that controls the fluid control valve based on a measurement value of the flow rate sensor, wherein the fluid control valve comprises:

an orifice having a valve seat surface; and a valve body having a seating surface to be seated on the valve seat surface, wherein the orifice has a plurality of inflow ports and a plurality of outflow ports that are open along a first direction on the valve seat surface, and the plurality of inflow ports and the plurality of outflow ports are arranged side by side in a second direction intersecting the first direction.

10. A method for manufacturing an orifice having a valve seat surface on which a valve body of a fluid control valve is to be seated, the method comprising:

forming a plurality of inflow ports and a plurality of outflow ports that are open along a first direction on the valve seat surface of the orifice, and forming the plurality of inflow ports and the plurality of outflow ports side by side in a second direction intersecting the first direction;

forming a first internal flow path that is open to the valve seat surface and an opposing surface facing the valve seat surface; and forming a second internal flow path that is open to the valve seat surface and an outer peripheral surface between the valve seat surface and the opposing surface, wherein the first internal flow path communicates with one of the plurality of inflow ports and the plurality of outflow ports, and the second internal flow path communicates with the other of the plurality of inflow ports and the plurality of outflow ports.

* * * * *